United States Patent
Yamaguchi et al.

(10) Patent No.: US 10,122,019 B2
(45) Date of Patent: Nov. 6, 2018

(54) IONIC LIQUID FILLED POROUS CARBON ANODE ACTIVE MATERIAL AND METHOD FOR MANUFACTURING THE SAME

(71) Applicant: TOYOTA JIDOSHA KABUSHIKI KAISHA, Toyota-shi, Aichi-ken (JP)

(72) Inventors: Hiroyuki Yamaguchi, Susono (JP); Shinji Nakanishi, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 15/238,040

(22) Filed: Aug. 16, 2016

(65) Prior Publication Data

US 2017/0062823 A1   Mar. 2, 2017

(30) Foreign Application Priority Data

Aug. 31, 2015   (JP) .................................. 2015-171284

(51) Int. Cl.

| | | |
|---|---|---|
| *H01M 4/583* | (2010.01) | |
| *H01M 4/587* | (2010.01) | |
| *H01M 4/04* | (2006.01) | |
| *H01M 4/133* | (2010.01) | |
| *H01M 4/1393* | (2010.01) | |
| *H01M 4/36* | (2006.01) | |
| *H01M 10/0525* | (2010.01) | |
| *H01M 10/058* | (2010.01) | |
| *H01M 4/02* | (2006.01) | |
| *H01M 10/052* | (2010.01) | |
| *H01M 10/0562* | (2010.01) | |

(52) U.S. Cl.
CPC .......... *H01M 4/587* (2013.01); *H01M 4/043* (2013.01); *H01M 4/133* (2013.01); *H01M 4/1393* (2013.01); *H01M 4/362* (2013.01); *H01M 10/058* (2013.01); *H01M 10/0525* (2013.01); *H01M 10/052* (2013.01); *H01M 10/0562* (2013.01); *H01M 2004/027* (2013.01)

(58) Field of Classification Search
None
See application file for complete search history.

(56) References Cited

U.S. PATENT DOCUMENTS

| 2010/0075222 A1 | 3/2010 | Watanabe | |
| 2015/0093310 A1* | 4/2015 | Bohringer | ................ B01J 20/20 |
| | | | 423/210 |

FOREIGN PATENT DOCUMENTS

| JP | 2003-068361 A | 3/2003 |
| JP | 2008-300173 A | 12/2008 |
| JP | 2013-191547 A | 9/2013 |
| WO | 2008/056585 A1 | 5/2008 |

\* cited by examiner

Primary Examiner — Lucas J. O'Donnell
(74) Attorney, Agent, or Firm — Oliff PLC (57) ABSTRACT

Provided is a method for manufacturing an anode active material particle having good lithium ion conducting property and good formability. The method for manufacturing an anode active material includes a first step of making a carbon particle with pores have contact with an ionic liquid having a lithium ion conducting property, and making the ionic liquid flow into the pores, and a second step of washing the carbon particle after the first step, while leaving the ion liquid inside the pores.

10 Claims, 6 Drawing Sheets

IONIC LIQUID FILLED POROUS CARBON ANODE ACTIVE MATERIAL AND METHOD FOR MANUFACTURING THE SAME

TECHNICAL FIELD

The present disclosure relates to anode active material particles and methods for manufacturing anode active material particles.

BACKGROUND

Carbon is used for anode active materials for batteries. For example, Patent Literature 1 discloses an all-solid-state battery including a carbon material as an anode active material. Patent Literature 2 discloses a lithium battery including a cathode mixture containing a sulfur containing material, an ionic liquid, and an inorganic solid electrolyte. Patent Literature 2 discloses that carbon can be used for an anode. Patent Literature 3 discloses a lithium battery including an ionic liquid filling the area between anode active material particles. In Patent Literature 3, carbon graphite, mesoporous carbon and the like are given as examples of the anode active material.

CITATION LIST

Patent Literature

Patent Literature 1: JP 2003-068361 A
Patent Literature 2: JP 2013-191547 A
Patent Literature 3: JP 2008-300173 A

SUMMARY

Technical Problem

Carbon particles have pores. Thus, if a carbon particle is used as an anode active material, a problem of securing ion paths in the pores arises. In all-solid-state lithium batteries like the battery disclosed in Patent Literature 1, a solid electrolyte is used as the electrolyte, which makes it difficult to allow the electrolyte to enter into the pores, and it is not possible to secure ion paths in the pores. Therefore, there is a possibility that the resistance increases and the discharge capacity decreases. On the other hand, it is considered that filling the area between active material particles with an ionic liquid is effective for increasing the ion paths in the electrode, as disclosed in Patent Literatures 2 and 3. However, if the area between anode active material particles is filled with an ionic liquid, the press formability in making batteries gets worse. Therefore, when a carbon particle is used as an anode active material, it is difficult to provide both the improvement in the ion conducting property of an anode (specifically, securement of ion paths in pores) and securement of the formability.

An object of the present disclosure is to provide an anode active material particle that can provide both the improvement in the ion conducting property and securement of the formability, and a method for manufacturing the anode active material particle.

Solution to Problem

In order to solve the above problems, the present disclosure takes the following structures.

That is, a first embodiment of the present disclosure is a method for manufacturing an anode active material particle including: a first step of making a carbon particle with pores have contact with an ionic liquid having a lithium ion conducting property, and making the ionic liquid flow into the pores; and a second step of washing the carbon particle after the first step, while leaving the ion liquid inside the pores.

In the present disclosure, "making a carbon particle with pores have contact with an ionic liquid having a lithium ion conducting property" includes, for example, a form where a carbon particle is immersed in an ionic liquid (or a solvent containing an ionic liquid), and a form where an ionic liquid (or a solvent containing an ionic liquid) is sprayed over a carbon particle, to moisturize the carbon particle with the ionic liquid. "washing the carbon particle, while leaving the ionic liquid inside the pores" means that a washing is carried out to the carbon particle to preferentially remove excessive ionic liquid on the outer surfaces of the carbon particle (among the surfaces of the carbon material, the surfaces which do not form the inner walls of the pores), while leaving the ionic liquid inside the pores. The "washing" is not limited as long as it is a step of physically removing the ionic liquid from the surfaces of the carbon particle. Regarding the ionic liquid existing on the surfaces of the carbon particle, the ionic liquid existing outside the pores is easier to be removed than the ionic liquid existing inside the pores. Therefore, "washing the carbon particle, while leaving the ionic liquid inside the pores" can be done by a normal washing.

In the first step according to the first embodiment of the present disclosure, a decompression inside the system with the carbon particle immersed in the ionic liquid may be carried out, to discharge the gas existing inside the pores to the outside of the pores and make the ionic liquid flow into the pores. Immersion of the carbon particle under a reduced pressure makes it possible to efficiently discharge the air inside the pores of the carbon particle to the outside of the pores, and it is possible to make the ionic liquid efficiently flow into the pores of the carbon particle.

In the second step according to the first embodiment of the present disclosure, the carbon particle may be washed with an organic solvent. This makes it possible to efficiently remove the ionic liquid existing outside the pores of the carbon particle, from the surfaces of the carbon particle.

In the present disclosure, the ionic liquid may include a TFSA anion.

In the first embodiment of the present disclosure, the carbon particle may be a graphite particle, specifically may be a natural graphite particle. Graphite particles have a lot of pores, which makes the effect of the present disclosure further remarkable.

In the first embodiment of the present disclosure, the particle size of the carbon particle may be in the range of from 0.1 μm to 50 μm.

In the first embodiment of the present disclosure, the specific surface area of the carbon particle may be more than $0.5 \, m^2/g$ to $10 \, m^2/g$.

In the first embodiment of the present disclosure, the specific surface area of the anode active material particle may be in the range of from $0.5 \, m^2/g$ to $2 \, m^2/g$. In the present disclosure, the specific surface area of the anode active material is smaller than the specific surface area of the carbon particle itself, because the ionic liquid exists in the pores of the carbon particle.

A second embodiment of the present disclosure is a method for manufacturing an anode including a step of carrying out a pressure forming on an anode mixture including the anode active material particle manufactured by the method according to the manufacturing method according to the first embodiment of the present disclosure.

A third embodiment of the present disclosure is a method for manufacturing a lithium battery, the method including the steps of: arranging the anode manufactured by the method according to the second embodiment of the present disclosure in a manner that the anode has contact with one surface of an inorganic solid electrolyte layer; and arranging a cathode on the other surface of the inorganic solid electrolyte layer.

A fourth embodiment of the present disclosure is an anode active material particle including: a carbon particle with pores; and an ionic liquid having lithium ion conducting property arranged inside the pores of the carbon particle, wherein a ratio B/A is no more than 0.80, wherein A is a value of a specific surface area of the carbon particle and B is a value of a specific surface area of the anode active material particle. The "specific surface area" means a specific surface area measured by a BET method.

In the fourth embodiment of the present disclosure, the ratio D/C may be no more than 0.80, wherein C is the volume of the pores each having a pore diameter of no more than 100 nm in the carbon particle and D is the volume of the pores each having a pore diameter of no more than 100 nm in the anode active material particle. The "volume of the pores each having a pore diameter of no more than 100 nm" is measured by a BET method. The "pore diameter" means the maximum diameter of the opening portion of a pore.

A fifth embodiment of the present disclosure is an anode active material particle including a carbon particle with pores, and an ionic liquid having a lithium ion conducting property arranged inside the pores of the carbon particle, wherein a ratio of D/C is no more than 0.80 wherein C is the pore volume of the pores each having a pore diameter of no more than 100 nm in the carbon particle, and D is the pore volume of the pores each having a pore diameter of no more than 100 nm in the anode active material particle.

The present disclosure makes it possible to arrange an ionic liquid in pore portions of a carbon particle in the first step, and to efficiently remove the ionic liquid from the outer surfaces of the carbon particle (among the surfaces of the carbon particle, surfaces that do not form the inner walls of the pores, the surfaces that may be contact surfaces of carbon particles when the carbon particle is used for an anode) in the second step, while leaving the ionic liquid inside the pore portions. This makes it possible to obtain a particle that can go through efficient press forming as a powder, not having "stickiness" of carbon particles, the particle securing the ion conducting property inside the pores at the same time. That is, according to the present disclosure, it is possible to manufacture an anode active material particle which can provide both the improvement in the ion conducting property and securement of the formability.

DESCRIPTION OF EMBODIMENTS

1. Method for Manufacturing Anode Active Material Particle

Figure 1:
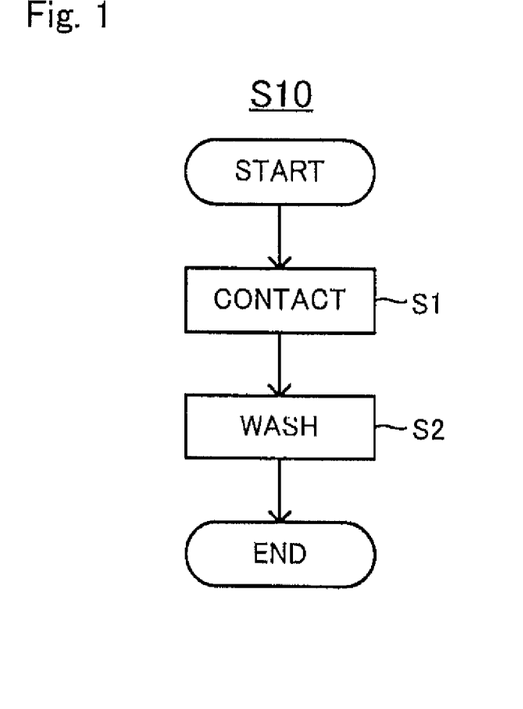
FIG. 1 is a flowchart to explain a method for manufacturing an anode active material particle.

A manufacturing method S10 of an anode active material particle 10 according to the first embodiment of the present disclosure will be described with reference to FIGS. 1 and 2. As shown in FIGS. 1 and 2, the manufacturing method S10 includes a first step (S1) of making a carbon particle 1 with pores 1a have contact with an ionic liquid 2 having a lithium ion conducting property, and making the ionic liquid 2 flow into the pores 1a, and a second step (S2) of washing the carbon particle 1 after the first step (S1), while leaving the ionic liquid 2 inside the pores 1a.

1.1. Carbon Particle 1

Figure 2A:
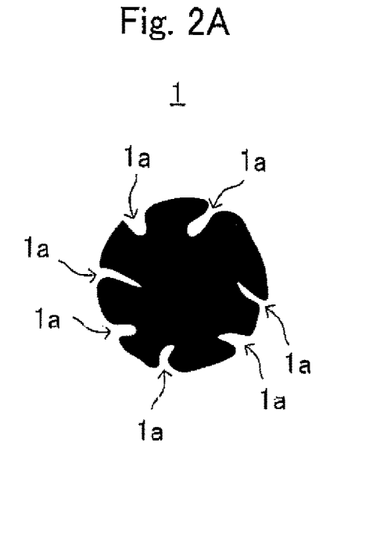
FIGS. 2A-2D are schematic views to explain the method for manufacturing an anode active material particle.

The carbon particle 1 used in the present disclosure is a carbon particle with pores, as schematically shown in FIG. 2A. The carbon particle 1 is not limited as long as it is conventionally used as an anode active material. Examples thereof include: graphite particles such as natural graphite and artificial graphite; hard carbon; soft carbon; and mesocarbon micro beads (MCMB). Among them, graphite particles may be used, and a natural graphite particle may be used. This is because graphite particles have a lot of pores, which makes the effect of the present disclosure further remarkable.

The pore diameter of each pore 1a of the carbon particle 1 is not particularly limited. The pore 1a may have any pore diameters depending on the kind and size of the carbon particle 1. The depth of the pore 1a of the carbon particle 1 is not particularly limited either. The pore 1a can have any depths depending on the kind and size of the carbon particle 1.

The particle size of the carbon particle 1 may be in the range of from 0.1 μm to 50 μm. The lower limit of the particle size may be no less than 1 μm, and may be no less than 2 μm. The upper limit may be no more than 30 μm, and may be no more than 10 μm. With a particle size like this, it is possible to further properly carry out a press forming on the carbon particle as a powder in manufacturing an anode.

The "particle size" of the carbon particle 1 can be measured by a laser diffraction-scattering type particle size distribution measuring device.

The specific surface area of the carbon particle 1 may be in the range of from 0.5 m$^2$/g to 10 m$^2$/g. The lower limit of the specific surface area may be no less than 1 m$^2$/g. The upper limit may be no more than 8 m$^2$/g, and may be no more than 7 m$^2$/g. The carbon particle 1 having such a specific surface area has a lot of pores 1a, and as a result, the effect of the present disclosure gets further remarkable.

The "specific surface area" of the carbon particle 1 can be measured by a BET method. Alternatively, the specific surface area of the carbon particle 1 can be measured by carrying out an image analysis on the anode active material particle by a SEM.

1.2. Ionic Liquid 2

As the ionic liquid 2 used for the present disclosure, existing liquids which can be conventionally applied as an electrolyte solution of lithium batteries can be used without particular limitations. Specifically: chain ammonium-based ionic liquids such as trimethylbutylammonium-bis(trifluoromethylsulfonyl)amide, trimethylbutylammonium-tri(pentafluoroethyl)trifluorophosphate, trimethylbutylammonium-tetrafluoroborate, N,N-diethyl-N-(2-methoxyethyl)-N-methylammonium-bis(trifluorom ethylsulfonyl)amide, and N,N-diethyl-N-methylmethoxyethylammonium-bis(fluorosulfonyl)amide;

cyclic ammonium-based ionic liquids such as N-methyl-N-propylpiperidinium-bis(trifluoromethylsulfonyl)amide, N-methyl-N-propylpyrrolidinium-bis(trifluoromethylsulfonyl)amide, N-buthyl-N-methylpiperidinium-bis(trifluoromethylsulfonyl)amide, N-buthyl-N-methylpyrrolidinium-bis(trifluoromethylsulfonyl)amide, 1-methoxyethyl-1-methylpyrrolidinium-tris(pentafluoroethyl)tri fluorophosphate, 1-methoxyethyl-1-methylpyrrolidinium-trifluoromethanesulfonate, and 1-methoxyethyl-1-methyl-pyrrolidinium-tetrafluoroborate;

aromatic ionic liquids such as 1-ethyl-3-methylimidazolium-bis(trifluoromethanesulfonyl)amide, 1-ethyl-3-methyl-imidazolium-bis(fluorosulfonyl)amide, and 1-ethyl-3-methylimidazolium-tris(pentafluoroethyl)trifluorophosphate;

phosphonium-based ionic liquids such as tetrabutylphosphonium-bis(trifluoromethanesulfonyl)amide, tetrabutyl-phosphonium-bis(fluorosulfonyl)amide, and tetrabutylphosphonium-tris(pentafluoroethyl) trifluorophosphate; and sulfonium-based ionic liquids such as triethylsulfonium-bis(trifluoromethanesulfonyl)amide, triethylsulfonium-bis(fluorosulfonyl)amide, and triethylsulfonium-tris(pentafluoroethyl)trifluorophosphate.

Among them, quaternary ammonium salt-based ionic liquids and quaternary phosphonium-based ionic liquids may be used. Quaternary ammonium salt-based ionic liquids including a trifluoromethanesulfonyl amide (TFSA) anion, and quaternary phosphonium ionic liquids including a trifluoromethanesulfonyl amide (TFSA) anion may be used. In the present disclosure, one kind of ionic liquid can be used alone, or two or more kinds of ionic liquids can be used in combination, for the ionic liquid 2.

In the present disclosure, the ionic liquid 2 has a lithium ion conducting property. That is, a lithium salt may be dissolved in the ionic liquid 2. The concentration of lithium ions included in the ionic liquid 2 is not particularly limited, and may be in the range of from 0.01 mol/L to 1.0 mol/L. The lower limit may be no less than 0.1 mol/L, and may be no less than 0.2 mol/L. The upper limit may be no more than 0.9 mol/L, and may be no more than 0.6 mol/L. With the lithium ions in these ranges, the ionic liquid 2 can secure good lithium ion conducting property.

1.3. First Step (S1)

The first step (S1) is a step of making the carbon particle 1 have contact with the above-mentioned ionic liquid 2 (for example, FIG. 2B), and making the ionic liquid 2 flow into the pore 1a. For example, a form where the carbon particle 1 is immersed in the ionic liquid 2, and a form where the ionic liquid 2 is sprayed over the carbon particle 1 can be given. Here, in making the ionic liquid 2 have contact with the carbon particle 1, the ionic liquid 2 may be diluted with a solvent, to have contact with the carbon particle 1.

Figure 2B:
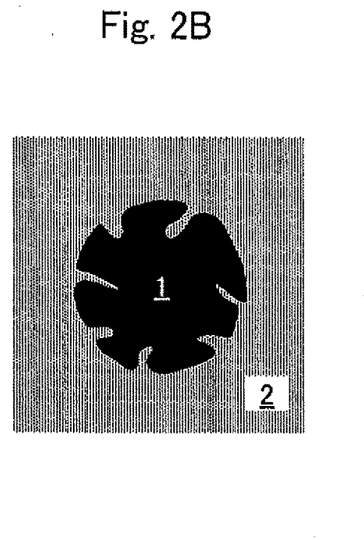

In S1, the ionic liquid 2 needs to flow into the pore 1a. For example, by making the ionic liquid 2 have contact with the carbon particle 1 for a long time, the ionic liquid 2 gradually flows into the pore 1a in a manner to get through the carbon particle 1. Here, in view of efficiently making the ionic liquid 2 flow into the pore 1a, some kind of treatment operation may be carried out, in addition to simply making the ionic liquid 2 have contact with the carbon particle 1. For example, in S1, by immersing the carbon particle 1 in the ionic liquid 2, and then reducing the pressure inside the system, the air inside the pore 1a can be efficiently discharged outside the pore 1a, therefore it is possible to make the ionic liquid 2 efficiently flow into the pore 1a. Especially, in S1, by reducing the pressure inside the system to efficiently discharge the air inside the pore 1a to the outside, and thereafter further applying pressure, it is possible to make the ionic liquid 2 further efficiently flow into the pore 1. Alternatively, in S1, by immersing the carbon particle 1 in the ionic liquid 2, and then applying a mechanical energy to the carbon particle 1 and the ionic liquid 2, it is possible to promote the flow of the ionic liquid 2 into the pore 1a. Or, in S1, by heating at least either one of the carbon particle 1 and the ionic liquid 2 in a state where the ionic liquid 2 has contact with the carbon particle 1, it is possible to degrade the viscosity of the ionic liquid 2, therefore it is possible to promote the flow of the ionic liquid 2 into the pore 1a.

Specifically, a form where the carbon particle 1 is immersed in the ionic liquid 2 and then the pressure inside the system is reduced may be taken. This form can make the ionic liquid 2 flow into the pore 1a most efficiently. In this case, for example, the carbon particle 1 may be immersed in the ionic liquid 2 under atmospheric pressure, thereafter the pressure inside the system may be reduced until no more than 50 kPa, or until no more than 10 kPa. The reducing and recovering of the pressure may be repeated.

In a case where the carbon particle 1 is immersed in the ionic liquid 2, fine air bubbles are discharged from the pore 1a, with the flow of the ionic liquid 2 into the pore 1a. Therefore, the termination of S1 can be figured out based on whether air bubbles are discharged or not discharged any more. That is, after the discharge of air bubbles gets few, the second step described later can be done. Alternatively, from the volume of the air bubbles discharged in S1, the filling rate of the ionic liquid 2 in the pore 1a can be specified. After the filling rate of ionic liquid 2 is judged as a predetermined value or more, the second step described later can be done.

1.4. Second Step (S2)

The second step (S2) is a step of, after the first step (S1), washing the carbon particle 1 while leaving the ionic liquid 2 inside the pore 1a.

Figure 2C:
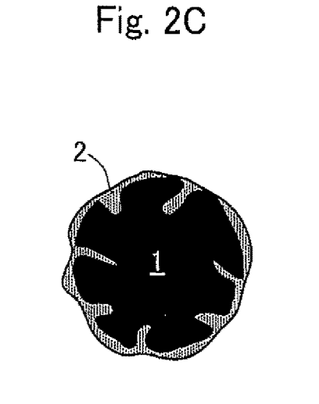

The carbon particle which went through S1 is in a state that its whole surface is covered by the ionic liquid 2 (for example, FIG. 2C). That is, the carbon particle 1 is sticky. The carbon particle 1 whose whole surface is covered by the ionic liquid 2 is difficult to be used as an anode active material particle as it is. This is because the carbon particle 1 in such a state cannot be subject to a press forming appropriately as a powder. Thus, in the present disclosure, the carbon particle 1 is washed in S2.

As to the ionic liquid 2 on the surfaces of the carbon particle 1, the ionic liquid 2 existing outside the pore 1 is easier to be removed by the washing, than the ionic liquid 2 existing inside the pore 1a. Therefore, by a normal washing operation, it is possible to "wash the carbon particle 1 while leaving the ionic liquid 2 inside the pore 1a". Thus, the washing in S2 is not limited as long as it is an operation with which the ionic liquid can be physically removed from the surfaces of the carbon particle 1. For example, a form where the carbon particle 1 is washed with an organic solvent, and a form where an absorption member (e.g. filter paper) which can absorb liquid is made to have contact with the surfaces of the carbon particle 1, to absorb and remove the ionic liquid 2 can be given.

According to the findings of the inventors of the present disclosure, the former form where an organic solvent is used has a higher removal efficiency of the ionic liquid 2, and is easier to secure the formability of the anode active material particle 10 as a powder, than the latter form where an absorption member is used. That is, the surfaces of the carbon particle 1 may be washed with an organic solvent. The kind of the organic solvent is not particularly limited, and an organic solvent which can efficiently remove the ionic liquid 2 and which has a certain amount of volatility may be used. Polar solvents may also be used. For example, carbonate solvents such as dimethyl carbonate, carbonic acid ester solvents such as ethyl acetate, and ether solvents such as dimethoxyethane may be used. The washing may be repeated twice or more.

If the carbon particle 1 is washed with an organic solvent, the remaining organic solvent on the surfaces of the carbon particle 1 needs to be removed after the washing. In this case, a natural drying, heat drying, and decompression drying can be carried out. Especially, a decompression drying may be carried out, in view of efficiently removing the organic solvent. The degree of decompression in the decompression drying is not particularly limited. It is possible to volatilize the organic solvent by a drying treatment while leaving the ionic liquid 2 inside the pore 1a, because organic solvents have higher volatilities than that of the ionic liquid 2.

1.5. Anode Active Material Particle 10

Figure 2D:
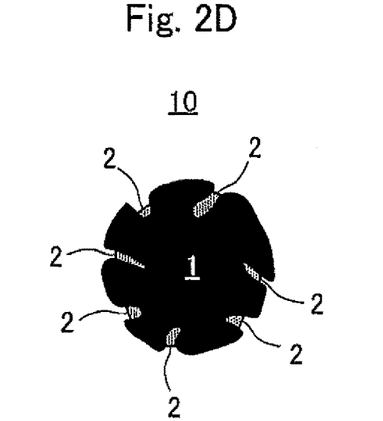

By the manufacturing method S10 as described above, it is possible to manufacture the carbon particle 1, as the anode active material particle 10, where the ionic liquid 2 is arranged inside the pore 1a (for example, FIG. 2D). The anode active material particle 10 manufactured by the manufacturing method S10 has the ionic liquid 2 mainly inside the pore 1a. The ionic liquid 2 outside the pore 1a is removed in such a degree that the ionic liquid 2 does not cause any problems in manufacturing electrodes. Therefore, it is possible to sustain the powder forms when a plurality of particles 10 are gathered, and to easily shape them by applying pressure. In addition, by having the ionic liquid 2 inside the pore 1a, it is possible to realize a lithium ion conducting property at the part of the pore 1a. That is, according to the manufacturing method S10, it is possible to manufacture the anode active material particle 10 that can realize both the improvement in the lithium ion conducting property and securement of the formability. The anode active material particle 10 can be used especially as an anode active material for lithium batteries.

The anode active material particle 10 manufactured by the present disclosure includes the ionic liquid 2 inside the pore 1a. Thus the specific surface area of the anode active material particle 10 is smaller than the specific surface area of the carbon particle 1 itself (specific surface area before the ionic liquid 2 is arranged). For example, according to the findings of the inventors of the present disclosure: the anode active material particle 10 manufactured by the present disclosure includes the carbon particle 1 with the pore 1a, and the ionic liquid 2 having a lithium ion conducting property arranged inside the pore 1a of the carbon particle 1; and the ratio B/A is no more than 0.80, wherein A is the value of the specific surface area of the carbon particle 1 and B is the value of the specific surface area of the anode active material particle 10. The lower limit of the ratio B/A may be no less than 0.45, and may be no less than 0.50. The upper limit may be no more than 0.75.

The specific surface area of the anode active material particle can be measured by a BET method.

As the specific value of the specific surface area, for example, if the specific surface area A of the carbon particle 1 is more than 0.5 $m^2/g$ to 10 $m^2/g$, the specific surface area B of the anode active material particle 10 may be in the range of from 0.5 $m^2/g$ to 2 $m^2/g$, and smaller than the specific surface area of the carbon particle 1.

The anode active material particle 10 manufactured by the present disclosure includes the ionic liquid 2 arranged inside the pore 1a, and the pore volume thereof is small. For example, according to the findings of the inventors of the present disclosure: the anode active material particle 10 manufactured by the present disclosure includes the carbon particle 1 with the pore 1a, and the ionic liquid 2 having a lithium ion conducting property arranged inside the pore 1a; and the ratio D/C is no more than 0.80, wherein C is the volume of the pores each having a pore diameter of no more than 100 nm in the carbon particle 1 and D is the volume of the pores each having a pore diameter of no more than 100 nm in the anode active material particle. The lower limit of the ratio D/C may be no less than 0.30, and may be no less than 0.40. The upper limit may be no more than 0.70.

As a specific value of the pore volume, for example the pore volume D of the anode active material particle may be no more than 0.007 $cm^3/g$. The lower limit may be no less than 0.003 $cm^3/g$, and the upper limit may be no more than 0.006 $cm^3/g$.

Specifically, the anode active material particle 10 manufactured by the present disclosure may satisfy both the above-described ratio B/A of the specific surface area and the above-described ratio D/C of the pore volume. This makes it possible to secure further excellent ion conducting property and the formability.

In the above description, a form where only the carbon particle 1 is made to have contact with the ionic liquid 2 in S1 was described. However, the present disclosure is not limited to this form. For example, the carbon particle 1 can be made to have contact with the ionic liquid 2, with another solid material. For example, a mixture of the carbon particle 1 and an inorganic solid electrolyte (and a binder and a conductive assistant) can be made to have contact with the ionic liquid 2. There is little possibility of elusion of the inorganic solid electrolyte even though the inorganic solid electrolyte and the like are made to have contact with the ionic liquid 2, with the carbon particle 1. This is because the inorganic solid electrolyte and the like are stable to the ionic liquid 2. However, the inorganic solid electrolyte possibly dilutes to a polar solvent, and on the other hand, in some cases, it is difficult to wash the ionic liquid 2 with a non-polar solvent. Considering this, when a mixture of the carbon particle 1 and an inorganic solid electrolyte (and a binder and a conducive assistant) is made to have contact with the ionic liquid 2, it is better to make an absorption member that can absorb liquid (e.g. filter paper) have contact with the surfaces of the carbon particle 1 and the inorganic solid electrolyte and the like, to make the absorption member absorb and remove the ionic liquid 2, than to carry out a washing with an organic solvent, in removing the ionic liquid 2 in S2.

2. Method for Manufacturing Anode

Figure 3A:
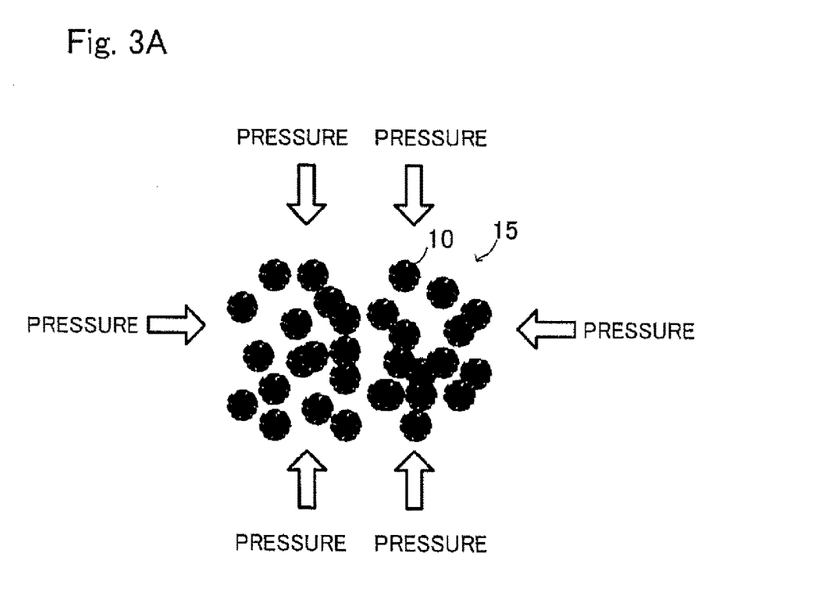
FIGS. 3A and 3B are schematic views to explain a method for manufacturing an anode.
Figure 3B:
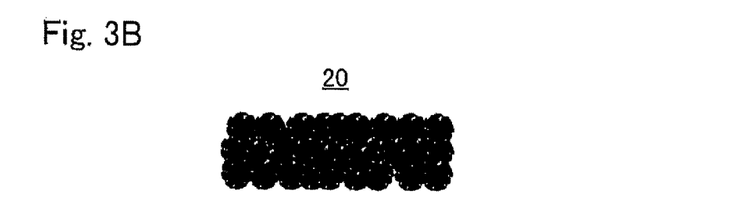

The present disclosure has an embodiment of a method for manufacturing an anode. That is, a method for manufacturing an anode including a step of carrying out a pressure forming on an anode mixture including the anode active material particle manufactured by the above-described method for manufacturing an anode active material particle. Hereinafter the method for manufacturing an anode according to the present disclosure will be described with reference to FIG. 3.

2.1. Anode Mixture 15

An anode mixture 15 shown in FIG. 3A at least includes the anode active material particle 10. In addition, the anode mixture 15 may include an optional material which is not shown. For example, an inorganic solid electrolyte, a binder, and a conductive assistant may be included. The anode mixture 15 including an inorganic solid electrolyte and the like in addition to the anode active material particle 10 may be easily obtained, for example by, after manufacturing the anode active material particle 10, mixing the anode active material particle 10 and the inorganic solid electrolyte and the like by a dry mixing. Alternatively, as described above, the anode mixture including the anode active material particle 10 and the inorganic solid electrolyte and the like can be obtained, by making the inorganic solid electrolyte and the like coexist with the carbon particle 1, in S1 and S2.

2.1.1. Inorganic Solid Electrolyte

As the inorganic solid electrolyte that can be included in the anode mixture 15, oxide solid electrolytes and sulfide solid electrolytes may be given. Examples of the oxide solid electrolytes include $Li_3PO_4$, $Li_2O-Al_2O_3-TiO_2-P_2S_5$, $Li_2O-Al_2O_3-GeO_2-P_2O_5$, $Li_2O-La_2O_3-TiO_2$, $Li_2O-La_2O_3-ZrO_2$, $Li_4Ti_5O_{12}$, and $Li_2O-P_2O_5-Nb_2O_5-B_2O_3-GeO_2$. Examples of the sulfide solid electrolytes include $Li_2S-SiS_2$, $LiI-Li_2S-SiS_2$, $LiI-Li_2S-P_2S_5$, $LiI-Li_2S-P_2O_5$, $LiI-Li_3PO_4-P_2S_5$, $Li_2S-P_2S_5$, and $Li_3PS_4$. The sulfide solid electrolytes may be used.

It is difficult for the inorganic solid electrolyte to get inside the pore 1a of the anode active material 10. Therefore, conventionally, it was difficult to secure ion conduction paths in the pore 1a. Regarding this, in the present disclosure, ion conduction paths can be secured even at the part of the pore 1a, because the ionic liquid 2 is arranged inside the pore 1a of the anode active material 10. In addition, the inorganic solid electrolyte possibly dissolves to a polar solvent, whereas it is stable to the ionic liquid, as described above. That is, the ionic liquid 2 included in the pore 1a of the anode active material particle 10 does not have any possibilities of making the inorganic solid electrolyte degraded, and therefore it is possible to keep a certain amount of capacity even though charge and discharge are repeated. In this way, in the present disclosure, the effect gets further remarkable if an inorganic solid electrolyte is included as an anode.

2.1.2. Binder

The binder that can be included in the anode mixture 15 is not particularly limited. Examples thereof include butadiene rubber (BR), polyvinylidene fluoride (PVdF), styrene butadiene rubber (SBR), and polytetrafluorcethylene (PTFE).

2.1.3. Conductive Assistant

As the conductive assistant that can be included in the anode mixture 15: carbon materials such as vapor grown carbon fiber, acetylene black (AB), Ketjen black (KB), carbon nanotube (CNT), and carbon nanofiber (CNF); and metallic materials which can endure the environment where all-solid-state batteries are used, can be given as examples.

The content of the anode active material particle 10 in the anode mixture 15 is not particularly limited. For example, based on the whole anode mixture 15 (100 mass %), the content can be in the range of from 40 mass % to 99 mass %. The amounts of the inorganic solid electrolyte and the binder may be adequately adjusted depending on the amount of the anode active material particle 10.

2.2. Pressure Forming

The above-described anode mixture 15 may be shaped in a certain form, by applying pressure. That is, the anode 20 can be easily produced by a pressure forming of powder in a dry method (FIGS. 3A and 3B). The magnitude of the pressure applied in the forming is not particularly limited, and it only has to be a magnitude with which a shape-retaining property as the anode 20 can be secured.

2.3. Anode 20

The shape (e.g. thickness) of the anode after the pressure forming is not particularly limited. According to the structure of batteries to be applied, the shape of the anode may be adequately selected. The anode 20 manufactured by the present disclosure includes the anode active material particle 10. As described above, the anode active material particle 10 includes the ionic liquid 2 arranged inside the pore 1a, and ion conduction paths are secured at the part of the pore 1a. Further, the anode active material particles 10, 10 can be firmly adhered to one another by a pressure forming of powder, and the anode 20 does not break up easily. This is because the amount of the ionic liquid 2 in between the anode active material particles 10, 10 is reduced. That is, the anode 20 has an excellent formability and strength, and also has excellent lithium ion conducting property. The anode 20 can be used especially as an anode for lithium batteries.

In the above description, a form where only the anode mixture 15 is independently subjected to a pressure forming is explained. However, the present disclosure is not limited to this form. By carrying out a pressure forming on a metallic foil (anode current collector) and the anode mixture 15 arranged on the surface of the metallic foil, it is possible to obtain the anode 20 to which the metallic foil is integrated. Alternatively, by carrying out a pressure forming on the inorganic solid electrolyte layer 30 described later and the anode mixture 15 arranged on the surface of the inorganic solid electrolyte layer 30, it is possible to obtain a layered body where the inorganic solid electrolyte layer 30 and the anode 20 are integrated to each other.

3. Method for Manufacturing Lithium Battery

Figure 4:
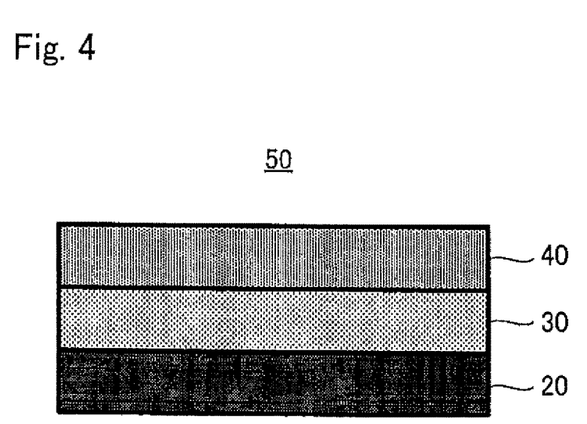
FIG. 4 is a schematic view to explain a structure of a lithium battery.

The present disclosure also has an embodiment as a method for manufacturing a lithium battery. That is, a method for manufacturing a lithium battery including a step of arranging the anode manufactured by the above-described manufacturing method, in a manner that the anode has contact to one surface of an inorganic solid electrolyte layer, and a step of arranging a cathode on the other surface of the inorganic solid electrolyte layer. This makes it possible to manufacture a lithium battery 50 including the anode 20 having contact with and arranged on one surface of the inorganic solid electrolyte layer 30, and a cathode 40 arranged on the other surface of the inorganic solid electrolyte layer 30.

3.1. Inorganic Solid Electrolyte Layer 30

As the inorganic solid electrolyte constituting the inorganic solid electrolyte layer 30, oxide solid electrolytes and sulfide solid electrolytes can be given as examples. Specifically, sulfide solid electrolytes may be used. Similar oxide solid electrolytes and sulfide solid electrolytes as the solid electrolytes and sulfide electrolytes that can be contained in the anode mixture 15 may be used. The inorganic solid electrolyte layer 30 may include a binder. As the binder, binders that can be contained in the anode mixture 15 may be used. The content of the binder included in the inorganic solid electrolyte layer is not particularly limited. The content of the binder contained in the inorganic solid electrolyte layer 30 may be no more than 5 mass %, in view of making it possible to form an inorganic solid electrolyte layer including an inorganic solid electrolyte not excessively aggregated but adequately dispersed, for the purpose of easily providing a high output power and so on.

The inorganic solid electrolyte layer 30 can be easily produced by applying a known method. For example, the inorganic solid electrolyte layer 30 can be produced by applying and drying a slurry of the above-described inorganic solid electrolyte and the like dispersed and adjusted in a liquid. In this case, as the liquid to disperse the inorganic solid electrolyte and the like, various kinds of organic solvents such as non-polar solvents may be used. For example, heptane and the like may be used. It is better not to use polar solvents because there is a possibility of elusion of the inorganic solid electrolyte with polar solvents, as described above. Alternatively, the inorganic solid electrolyte layer 30 may be produced through a process of mixing the above-described inorganic solid electrolyte and the like by a dry method and carrying out a press forming thereon. The thickness of the inorganic solid electrolyte layer is, while it widely differs depending on the structure of the battery, may be in the range of from 0.1 μm to 1 mm, and may be in the range of from 1 μm to 100 μm, for example.

3.2. Cathode 40

The cathode 40 is formed from a shaped cathode mixture. In addition to the cathode active material, the cathode mixture optionally contains an inorganic solid electrolyte, a binder, a conductive assistant, and the like.

3.2.1. Cathode Active Material

In the present disclosure, the cathode active material contained in the cathode mixture is not particularly limited as long as the cathode active material is conventionally known as a cathode active material for lithium batteries. Examples thereof include $LiN_{1/3}Co_{1/3}Mn_{1/3}O_2$, $LiCoO_2$, $LiNiO_2$, $LiFePO_4$, and $LiMn_2O_4$. The shape of the cathode active material may be in a particle or a thin film for example. The content of the cathode active material in the cathode 40 may be, though not particularly limited, in the range of from 40 mass % to 99 mass %, for example.

3.2.2. Inorganic Solid Electrolyte

The cathode mixture may contain an inorganic solid electrolyte, if necessary. As the inorganic solid electrolyte which can be contained in the cathode mixture, the above-described inorganic solid electrolytes which can be contained in the anode mixture 15 may be given as examples.

3.2.3. Layer that Covers Cathode Active Material

When a sulfide solid electrolyte is used as the inorganic solid electrolyte, the cathode active material may be covered by an ion conducting oxide, in view of making it easy to prevent the increase in battery resistance, by making it difficult to form a high resistance layer at the interfaces of the cathode active material and the inorganic solid electrolyte. As the lithium ion conducting oxide to cover the cathode active material, oxides represented by a general formula $Li_xAO_y$ (A is B, C, Al, Si, P, S, Ti, Zr, Nb, Mo, Ta, or W; each of x and y is a positive number) can be given for example. Specifically, $LiNbO_3$ and the like may be used. When the surface of the cathode active material is covered by an ion conducting oxide, the ion conducting oxide only has to cover at least a part of the cathode active material, or it may cover the whole surface of the cathode active material. The method of covering the surface of the cathode active material by an ion conducting oxide is not particularly limited, and a known method can be applied. The thickness of the ion conducting oxide covering the cathode active material may be in the range of from 0.1 nm to 100 nm, and may be in the range of from 1 nm to 20 nm, for example. The thickness of the ion conducting oxide may be measured by a transmission electron microscope (TEM) and the like.

3.2.4. Binder and Conductive Assistant

A known binder and conductive assistant that can be contained in a cathode of lithium batteries can be used for the cathode mixture. The same binders and the conductive assistants that can be contained in the anode mixture 15 are applied to the cathode mixture, therefore the explanations thereof are omitted.

The cathode 40 may be produced by either of a dry method or a wet method. For example, the cathode 40 can be produced with a cathode mixture, by a similar way of producing the anode 20 with the anode mixture 15. The producing method of the cathode 40 is well known, therefore the explanation thereof is omitted.

3.3. Anode Current Collector and Cathode Current Collector

The lithium battery is provided with an anode current collector and a cathode current collector, which are not shown. Known metal that can be used as a current collector of lithium batteries can be used. Examples thereof include metallic materials including one or two or more elements selected from the group consisting of Cu, Ni, Al, V, Au, Pt, Mg, Fe, Ti, Co, Cr, Zn, Ge, and In.

3.3. Lithium Battery 50

The lithium battery 50 may be produced by the steps of: arranging the anode 20 in a manner that the anode 20 has contact with one surface of the inorganic solid electrolyte layer 30; and arranging the cathode 40 on the other surface of the inorganic solid electrolyte layer 30. For example, by arranging the anode mixture 15 on one surface of the inorganic solid electrolyte layer 30 and carrying out a press forming thereon, it is possible to form and arrange the anode 20 in a manner that the anode 20 has contact with one surface of the inorganic solid electrolyte layer 30. On the other hand, by arranging the cathode mixture on the other surface of the inorganic solid electrolyte layer 30 and carrying out a press forming thereon, it is possible to form and arrange the cathode 40 on the other surface of the inorganic solid electrolyte layer 30. Alternatively, after separately producing the anode 20, the inorganic solid electrolyte layer 30, and the cathode 40, the anode 20 may be arranged in a manner that the anode 20 has contact with one surface of the inorganic solid electrolyte layer 30, and the cathode 40 may be arranged on the other surface of the inorganic solid electrolyte layer 30. In both ways, in the present disclosure, the lithium battery 50 may be manufactured by the same way as in conventional methods, excepting that the anode 20 is used as the anode.

The lithium battery 50 does not have to have other electrolyte solutions other than the ionic liquid 2 existing inside the anode 20. Sufficient lithium ion conducting property is provided by the inorganic solid electrolyte and the like even without electrolyte solutions. That is, the lithium battery 50 may be defined as an all-solid-state lithium battery regarding the anode 20 as a solid.

The anode 20 of the lithium battery 50 includes the ionic liquid 2 arranged inside the pore 1a of the anode active material particle 10. Here, in the lithium battery 50, although the anode 20 has contact with the inorganic solid electrolyte 30, the inorganic solid electrolyte is stable to the ionic liquid 2. Thus, even if the ionic liquid 2 in the anode 20 and the inorganic solid electrolyte layer 30 should have contact to each other, the inorganic solid electrolyte 30 does not get eluted, and it is possible to keep a certain amount of capacity even though charge and discharge are repeated (as described above, the same is applied when an inorganic solid electrolyte is contained in the anode 20). In addition, the anode 20 of the lithium battery 50 has an excellent formability, strength, and excellent lithium ion conducting property. Therefore, the lithium battery 50 has a large first discharge capacity and an excellent discharge capacity maintenance rate.

EXAMPLES

Example 1

1. Manufacture of Anode Active Material Particle

Natural carbon was subjected to a spheroidizing treatment, and covered by amorphous carbon. Thereby carbon particles (particle size: approximately 10 µm, specific surface area: 2.75 m$^2$/g) were obtained. In an observation by a SEM, a lot of pores were confirmed on the surfaces of the carbon particles. With 6.0 g of the carbon particles, 5.0 g of N-methyl-N-propylpiperidinium-bis(trifluoromethylsulfonyl)amide (PP13TFSA) in which LiTFSA of 0.32 mol/kg in concentration was dissolved was mixed as an ionic liquid, whereby the carbon particles were immersed in the ionic liquid. Thereafter, the pressure was reduced to 10 Pa, and recovered to the normal pressure. The reducing and recovering of the pressure were repeated, whereby the ionic liquid was made to flow into the pores of the carbon particles.

After that, the mixture of the carbon particles and the ionic liquid was filtered, whereby a filter product was obtained. In the filter product, excessive ionic liquid was left on the outside of the pores of the carbon particles. Then, the carbon particles were washed twice with 5 ml of dimethyl carbonate, with the ionic liquid remained inside the pores.

After that, by carrying out a vacuum drying (pressure: 10 Pa, temperature: 110° C.), the solvent was removed, and anode active material particles in which the ionic liquid was arranged inside the pores were obtained.

2. Manufacture of Anode

The obtained anode active material particles (1.2 g) and a sulfide solid electrolyte were mixed. The mixture was subjected to a press forming at a pressure of 40 kN, whereby an anode (thickness: 50 µm, size: 1 cm$^2$) was made. An appropriate press forming was able to be carried out to the anode active material particles as in a powder form, because excessive ionic liquid was removed from the particles.

3. Manufacture of Lithium Battery

A mixture of powder (1.7 g) consisting of a layered oxide including Li, Ni, Mn, and Co and a sulfide solid electrolyte (0.3 g) was subjected to a press forming at a pressure of 40 kN, whereby a cathode (thickness 40 µm: size 1 cm$^2$) was made. As a sulfide solid electrolyte, $Li_2S$—$P_2S_5$ (0.1 g) was subjected to a press forming at a pressure of 40 kN, whereby an inorganic solid electrolyte layer (size: 1 cm$^2$) was made. The produced anode, inorganic solid electrolyte layer, and cathode were arranged in the order mentioned, and unified. To the resultant material, a cathode current collector and an anode current collector were attached, whereby a lithium battery was made.

Example 2

Anode active material particles, anode, and lithium battery were made in the same way as in Example 1, except that the concentration of LiTFSA in PP13TFSA was changed to 0.62 mol/kg.

Example 3

Anode active material particles, anode, and lithium battery were made in the same way as in Example 1, except that Py13TFSA (N-methyl-N-propylpyrrolidium-bis(trifluoromethylsulfonyl)amid e) was used as the ionic liquid instead of PP13TFSA.

Example 4

Anode active material particles, anode, and lithium battery were made in the same way as in Example 1, except that Py13TFSA was used as the ionic liquid instead of PP13TFSA, and the concentration of LiTFSA was changed to 0.64 mol/kg.

Example 5

Anode active material particles, anode, and lithium battery were made in the same way as in Example 1, except that Py14TFSA (N-butyl-N-methylpyrrolidinium-bis(trifluoromethylsulfonyl)amide) was used as the ionic liquid instead of PP13TFSA.

Example 6

Anode active materials, anode, and lithium battery were made in the same way as in Example 1, except that DEMETFSA (N,N-dietyl-N-(2-methoxyethyl)-N-methylammonium-bis(trifluorom ethylsulfonyl)amide) was used as the ionic liquid instead of PP13TFSA.

Example 7

Anode active material particles, anode, and lithium battery were made in the same way as in Example 1, except that Py14TFSA was used as the ionic liquid instead of PP13TFSA, and the concentration of LITFSA was changed to 0.16 mol/kg.

Example 8

Anode active material particles, anode, and lithium battery were made in the same way as in Example 1, except that PP14TFSA (N-butyl-N-methylpiperidinium-bis(trifluoromethylsulfonyl)amid e) was used as the ionic liquid instead of PP13TFSA, and the concentration of LiTFSA was changed to 0.16 mol/kg.

Example 9

Anode active material particles, anode, and lithium battery were made in the same way as in Example 1, except that the concentration of LiTFSA in PP13TFSA was changed to 1.0 mol/kg.

Example 10

Anode active material particles, anode, and lithium battery were made in the same way as in Example 1, except that Py13TFSA was used as the ionic liquid instead of PP13TFSA, and the concentration of LiTFSA was changed to 1.0 mol/kg.

Comparative Example 1

Anode active material particles, anode, and lithium battery were made in the same way as in Example 1, except that the treatment by the ionic liquid was not carried out to the carbon particles, therefore the carbon particles were used as the anode active material particles as they were.

Comparative Example 2

Anode active material particles were made in the same way as in Example 1, except that the washing with dimethyl carbonate was not carried out. A lot of ionic liquid was left on the obtained anode active material particles, and a press forming was not able to be carried out to the anode active material particles.

4. Evaluation of Battery 4.1. Charge-Discharge Capacity Maintenance Rate

Figure 5:
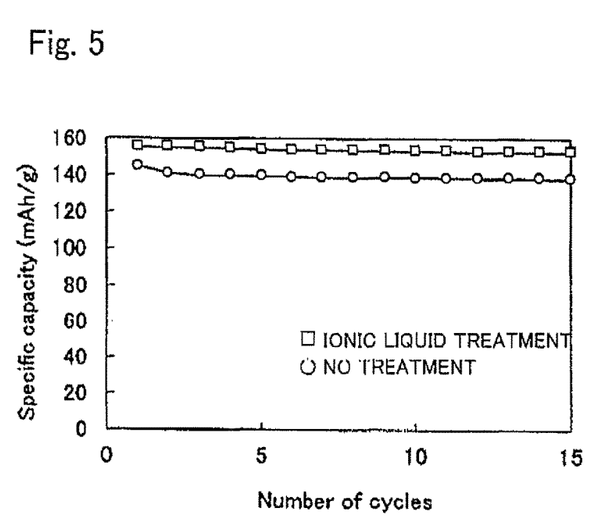
FIG. 5 is a graph showing an evaluation result of the discharge capacity maintenance rate.

As an evaluation index for the ion conducting property of the anode active material particles, the first discharge capacity and discharge capacity maintenance rate of each battery were measured. In particular, each battery of Examples and Comparative Examples was charged at a constant current 0.05 C until 4.2 V, to the capacity calculated from the cathode active material at 25° C. Thereafter each battery was charged at a constant voltage until 0.01 C. Next, each battery was discharged at a constant current until 3.0 V and then discharged at a constant voltage until 0.01 C. This cycle of charge and discharge was repeated. Based on the charge-discharge capacity at the first charge-discharge cycle (100%), the maintenance rate of the charge-discharge capacity at and after the second charge-discharge capacity was calculated. The results are shown in Table 1. FIG. 5 shows the transitions of the charge-discharge capacity maintenance rate of each battery of Example 1 and Comparative Example 1.

4.2. Resistance Measurement

Figure 6:
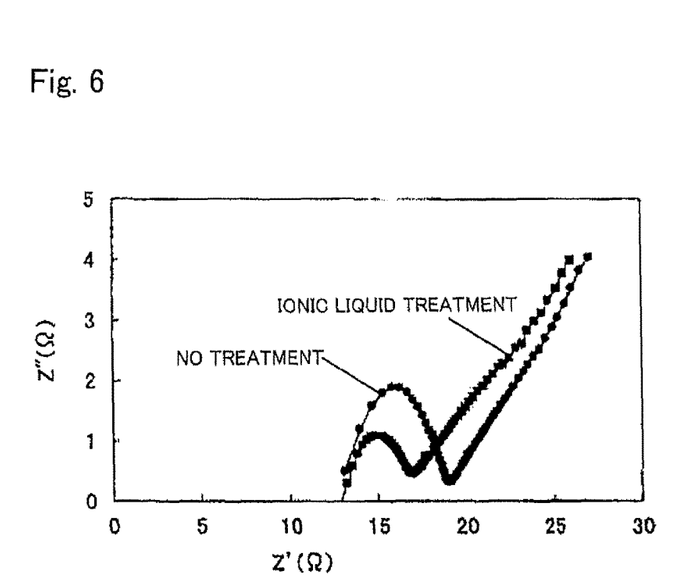
FIG. 6 is a graph showing an evaluation result of AC impedance.

As an evaluation index for the ion conducting property of the anode active material particles, the resistance of each battery was measured. In particular, the resistance of each battery was measured by a measurement of AC impedance at the time point where the battery was charged to 85% of the discharge capacity, after the first charge-discharge cycle. The results are shown in Table 1. The shown value in Table 1 for each battery is the value where the resistance component of circular arc is added to the DC resistance in the AC impedance measurement. FIG. 6 shows the measurement result of the AC impedance of each battery of Example 1 and Comparative Example 1.

5. Shape Evaluation of Anode Active Material Particle 5.1. Specific Surface Area The specific surface area of each of the anode active material particles of Examples 1 to 10 and the carbon particle of Comparative Example 1 was measured by a BET method. The results are shown in Table 1.

5.2. Pore Volume

By a BET method, "the volume of the pores each having a pore diameter of no more than 100 nm" of each of the anode active materials of Examples 1 to 10 and the carbon particle of Comparative Example 1 was measured. The results are shown in Table 1.

TABLE 1

| | Ionic liquid (Concentration of LiTFSA) | First discharge capacity (mAh/g) | Discharge capacity maintenance rate (%) | Resistance (Ω) | BET specific surface area (m2/g) | Volume of pores having diameter of no more than 100 nm (cm3/g) |
|---|---|---|---|---|---|---|
| Example 1 | PP13TFSA (0.32 mol/kg) | 163 | 98 | 17 | 1.46 | 0.004 |
| Example 2 | PP13TFSA (0.64 mol/kg) | 160 | 97 | 19 | 1.40 | 0.004 |
| Example 3 | Py13TFSA (0.32 mol/kg) | 164 | 98 | 17 | 1.76 | 0.006 |
| Example 4 | Py13TFSA (0.64 mol/kg) | 162 | 98 | 18 | 1.74 | 0.006 |
| Example 5 | Py14TFSA (0.32 mol/kg) | 161 | 97 | 19 | 1.92 | 0.007 |
| Example 6 | DEMETFSA (0.32 mol/kg) | 163 | 97 | 18 | 1.93 | 0.007 |
| Example 7 | Py14TFSA (0.16 mol/kg) | 162 | 98 | 18 | 1.98 | 0.007 |
| Example 8 | PP14TFSA (0.16 mol/kg) | 162 | 97 | 18 | 1.96 | 0.007 |
| Example 9 | PP13TFSA (1.0 mol/kg) | 160 | 97 | 18 | 1.17 | 0.003 |
| Example 10 | Py13TFSA (1.0 mol/kg) | 162 | 97 | 18 | 1.72 | 0.006 |
| Comparative Example 1 | No treatment | 157 | 97 | 19 | 2.73 | 0.009 |
| Comparative Example 2 | No washing | — | — | — | — | — |

As is obvious from the results shown in Table 1, the anode active material particles of Examples had smaller specific surface areas and pore volumes than those of the carbon particle of Comparative Example, by having contact with the ionic liquids. Therefore it was figured out that the ionic liquids were arranged inside their pores. Each battery of Examples described above had a higher first discharge capacity and better performance than those of the batteries of Comparative Examples. The batteries of Examples had the nearly same charge-discharge capacity maintenance rates, compared with those of the batteries of Comparative Examples. That is, any deterioration of batteries were not confirmed even in a case where the ionic liquid was arranged inside the pores of carbon particles, and it was found that excellent performance was able to be sustained. Further, the value of the resistance of each battery of Examples was small. The value was same as or smaller than the value of each battery of Comparative Examples, and each battery of Examples had excellent performance. This is obvious from the results shown in FIGS. 5 and 6.

In addition, as is obvious from the results shown in Table 1, it can be said that the anode active material particles of Examples had the following features. That is, each anode active material particle of Examples included a carbon particle with pores, and an ionic liquid arranged inside the pores of the carbon particle, the liquid having lithium ion conducting property, wherein a ratio B/A was no more than 0.80, wherein A was the value of the specific surface area of the carbon particle, and B was the value of the specific surface area of the anode active material particle. From the results shown in Table 1, the lower limit of the ratio B/A may be no less than 0.45, and may be no less than 0.50. The upper limit may be no more than 0.75.

In addition, as is obvious from the results shown in Table 1, it can be said that the anode active material particles of Examples had the following features. That is, each of the anode active material particles of Examples included a carbon particle with pores, and an ionic liquid arranged inside the pores of the carbon particle, the liquid having a lithium ion conducting property, wherein a ratio D/C was no more than 0.80, wherein C was the pore volume of pores each having a pore diameter of no more than 100 nm in the carbon particle, and D is the pore volume of pores each having a pore diameter of no more than 100 nm in the anode active material particle. From the results shown in Table 1, the lower limit of the ratio D/C may be no less than 0.30, and may be no less than 0.40. The upper limit may be no more than 0.70.

As described above, it was found that it is possible to manufacture an anode active material particle which can provide both the improvement in the ion conducting property and securement of the formability by: making the carbon particle with pores have contact with an ionic liquid having a lithium ion conducting property, and making the ionic liquid flow into the pores; and thereafter washing the carbon particle while leaving the ionic liquid inside the pores.

INDUSTRIAL APPLICABILITY

The anode active material particles obtained by the manufacturing method of the present disclosure can be widely used as anode active materials especially for lithium batteries.

DESCRIPTION OF REFERENCE NUMERALS 1 carbon particle
1a pore
2 ionic liquid
10 anode active material particle
15 anode mixture
20 anode
30 inorganic solid electrolyte layer
40 cathode
50 lithium battery

The invention claimed is:

1. A method for manufacturing an anode active material particle comprising:
    a first step of contacting a carbon particle having pores with an ionic liquid in which a lithium salt is dissolved, and making the ionic liquid flow into the pores; and
    a second step of washing the carbon particle with an organic solvent after the first step, while leaving the ionic liquid inside the pores.

2. The method according to claim 1, wherein in the first step, a decompression in a system is carried out with the carbon particle immersed in the ionic liquid, for discharging a gas existing inside the pores to the outside of the pores and making the ionic liquid flow into the pores.

3. The method according to claim 1, wherein the ionic liquid includes a TFSA anion.

4. The method according to claim 1, wherein the carbon particle is a graphite particle.

5. The method according to claim 4, wherein the graphite particle is a natural graphite particle.

6. The method according to claim 1, wherein a particle diameter of the carbon particle is in the range of from 0.1 μm to 50 μm.

7. The method according to claim 6, wherein a specific surface area of the carbon particle is more than 0.5 $m^2/g$ to 10 $m^2/g$.

8. The method according to claim 7, wherein a specific surface area of the anode active material particle is in the range of from 0.5 $m^2/g$ to 2 $m^2/g$, and smaller than the specific surface area of the carbon particle.

9. A method for manufacturing an anode comprising a step of carrying out a pressure forming on an anode mixture including the anode active material particle manufactured by the method according to claim 1.

10. A method for manufacturing a lithium battery, the method comprising:
    arranging the anode manufactured by the method according to claim 9 in a manner that the anode has contact with one surface of an inorganic solid electrolyte layer; and
    arranging a cathode on the other surface of the inorganic solid electrolyte layer.

* * * * *